United States Patent [19]

Gottstein et al.

[11] 4,365,680
[45] Dec. 28, 1982

[54] FORCE MEASURING DEVICE

[76] Inventors: Dietrich Gottstein, Lechnerstrasse 8, D-8026 Ebenhausen; Christian Nitschke, Savoyenstr. 4, 8 München 19, both of Fed. Rep. of Germany

[21] Appl. No.: 160,969

[22] Filed: Jun. 19, 1980

[30] Foreign Application Priority Data

Jun. 25, 1979 [DE] Fed. Rep. of Germany ....... 2925503
Jun. 25, 1979 [DE] Fed. Rep. of Germany ....... 2925504

[51] Int. Cl.³ .......................... G01G 7/00; G01G 3/14
[52] U.S. Cl. .............................. 177/212; 177/210 EM
[58] Field of Search ..................... 177/212, 210 EM

[56] References Cited

U.S. PATENT DOCUMENTS

| | | | |
|---|---|---|---|
| 3,786,884 | 1/1974 | Allenspach | 177/212 X |
| 4,150,730 | 4/1979 | Knothe et al. | 177/212 |
| 4,189,017 | 2/1980 | Strobel et al. | 177/212 |
| 4,235,296 | 11/1980 | Knothe et al. | 177/212 X |
| 4,236,590 | 12/1980 | Knothe et al. | 177/212 X |
| 4,245,711 | 1/1981 | Kunz | 177/212 |

*Primary Examiner*—George H. Miller, Jr.
*Attorney, Agent, or Firm*—Hume, Clement, Brinks, Willian & Olds, Ltd.

[57] ABSTRACT

A force measuring device of the electromagnetic compensation type is disclosed. The force measuring device includes a coil moving in a magnetic field, a display unit and a control circuit which returns the coil to its original position and supplies the display with the value of the forces being measured at substantially the same time. The device is also disclosed including a variable integration constant in the control circuit to provide a quicker response to small disturbances thus making the balance insensitive to vibrations.

28 Claims, 9 Drawing Figures

FORCE MEASURING DEVICE

BACKGROUND OF THE INVENTION

The invention relates to a force measuring device, particularly to a self-restoring precision balance with electromagnetic compensation. Balances where a load is supported by a coil moving in an air gap in a magnetic field are known. The movement of the coil is detected and the coil is provided with current to restore it to its original position. This principle is, for example, widely used in top loading precision balances.

It is a very common disadvantage of all balances that weighing jobs which involve the weighing-in of powders, liquids, etc, is time consuming and cumbersome for the personnel. The human organism is a control circuit itself. When weighing-in goods to a specific predetermined weight this control circuit is connected with the control circuit of the balance and the result is not optimal. One problem is that the display of the balance may take a second or more to respond to an increase in the load. This slows down the weighing-in of powders. Very often the user of the balance ends up with more than the target weight on the balance and some has to be taken off.

Another difficulty encountered typically in electromagnetic compensation balances is an oversensitivity to vibrations such as those caused in the ground supporting the balance or those caused by weighing live animals.

SUMMARY OF THE INVENTION

The general objective of the invention is the creation of a force measuring system, especially for a compensation balance of the above-described kind, which shows major improvements in ease of weighing and insensitivity to vibrations of the ground or of the load itself. To perform these improvements the present invention provides a control circuit which substantially simultaneously returns the coil to its original equilibrium position, also called the null position, while displaying the value of the forces being weighed. The present invention further provides for a variable integration constant in the control circuit to allow a quicker response to small disturbances thus keeping the balance steady despite vibrations.

A specific objective of the invention is to enable the display to respond to an increase in the load on the balance almost immediately after the mechanical system responds. The display is capable of changing about every millisecond. Thus, weighing-in of powders and liquids is faster and less tiresome. The display can be watched as it approaches the final value.

The value of the integration constant in the present invention can be made dependent upon the amount of the deviation of the coil from the null position. The integration constant is large for large deviations of the coil and is small for small deviations. Thus, the balance responds with fast compensation to disturbances such as vibrations of the ground.

Another objective of the present invention is to provide a simple and cheap balance through almost complete digitalization of the control circuit. In this embodiment, compensation is generated as a function of the comparison of two digital frequencies rather than the analog comparison of two voltages.

An advantage of the present invention is achieved by adding a value proportional to the null deviation of the coil onto the signals controlling the current to the coil. This technique is well known for stabilizing unstable control circuits.

Another advantage is accomplished in the present invention, by adding a signal corresponding to the differential of the null deviation to the signals controlling the display. This results in an optical phase advance of the display. Thus, the user of the balance sees a larger weight displayed than is actually on the balance while weighing in and the target weight is hit more accurately in less time.

A further objective of the present invention is to provide an improved resolution in a simple manner.

Another advantage of the present invention is the addition of a summing point amplifier for supplying the coil current. This improves control of the coil current and suppresses unwanted influence from a changing coil resistance which may be caused by temperature changes, for example. A further advantage of the invention is the addition of a voltage control circuit onto the coil control. The coil is supplied with a voltage from a voltage source rather than with a current pulse. This makes the coil more insensitive to movements caused by vibrations.

The present invention provides an advantageous modification by using a microprocessor in the control circuit. This is a cheap and simple way to perform the compensation control.

DETAILED DESCRIPTION OF THE PREFERRED EMBODIMENTS

Figure 1:
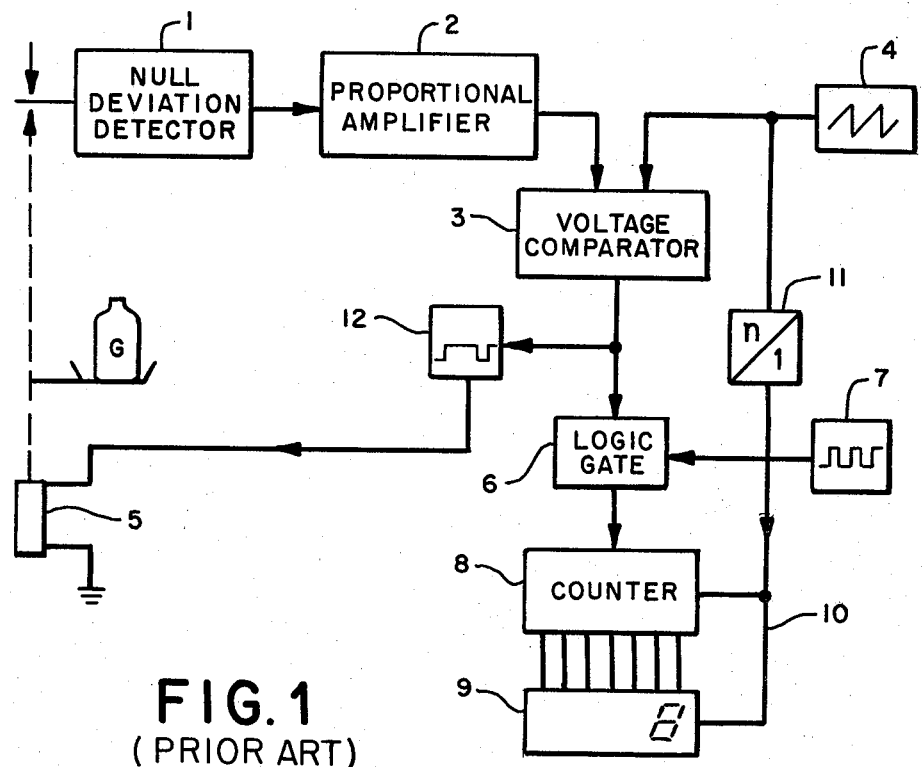
FIG. 1 is a schematic of a known electromagnetic compensation balance.

Referring now to FIG. 1, displayed is the block diagram of a known precision balance. The moving coil 5 mechanically connected to the load to be weighed, moves in a magnetic field created by a permanent magnet system in response to the load. The moving coil 5 compensates the force loaded upon it. The moving coil 5 is being controlled by a compensation control circuit comprising a null-deviation detector 1, followed by a proportional amplifier 2, a voltage comparator 3, and a constant current source 12 with a switch. Photo resistors in the null-deviation detector, which are mechanically connected with the moving coil 5 continuously sense the deviation of the coil 5 from an equilibrium null position. The output of the null-deviation detector 1 is a position signal whose voltage is proportional to the deviation. The position signal is amplified in the proportional amplifier 2 and compared with a saw-tooth frequency delivered by the generator 4 in the voltage comparator 3. The frequency of the saw-tooth generator 4 is normally around 1 kHz. Thus, the voltage comparator delivers a compensation pulse chain with the frequency of the saw-tooth voltage, the pulse widths being proportional to the amplitude of the voltage delivered by the amplifier 2. These compensation pulses are used to switch the constant current source 12. The current source 12 applies a certain, approximately constant current to the moving coil 5 during the duration of the pulses. Thus, the mechanical force of the load placed on the balance is being compensated by the counterforce generated in the coil 5.

The compensation pulses of the voltage comparator 3 at the same time control conversion means comprising: a logic gate 6, a square wave generator 7 and a counter 8. The logic gate 6 switches a counting frequency delivered by the square wave generator 7, on and off. The output of logic gate 6 is delivered to the counter 8. Counter 8 will, thus, only count the pulses of the generator 7, which appear during the duration of the compensation pulse. The result in the counter 8 is consequently an immediate measure of the duration of the compensation pulse. The result is delivered in a display signal to a display unit 9. A more precise value will be displayed if the counting period is made longer, for example, 500 milliseconds instead of 1 millisecond. For this purpose, the frequency divider 11 divides the frequency delivered by saw-tooth generator 4. It delivers the lower frequency on line 10 to control a reset for the counter 8 and a latch for the display 9. In other words, a control pulse on line 10 will latch the sum of all pulses counted in the counter 8, for example, during the last 0.5 sec. and reset the counter 8. The display 9 will now receive the sum of all pulses counted in the counter 8. A mean value for the forces being measured can be obtained by dividing by the number of saw-tooth pulses in the counting period. If frequency divider 11 divides by a power of 10, for example by 1000, the overfow of the decimal counter 8 will save the need for any further division of the final counter value. In this case, the counter 8 has 3 extra digits which are not connected to the display 9.

Figure 3:
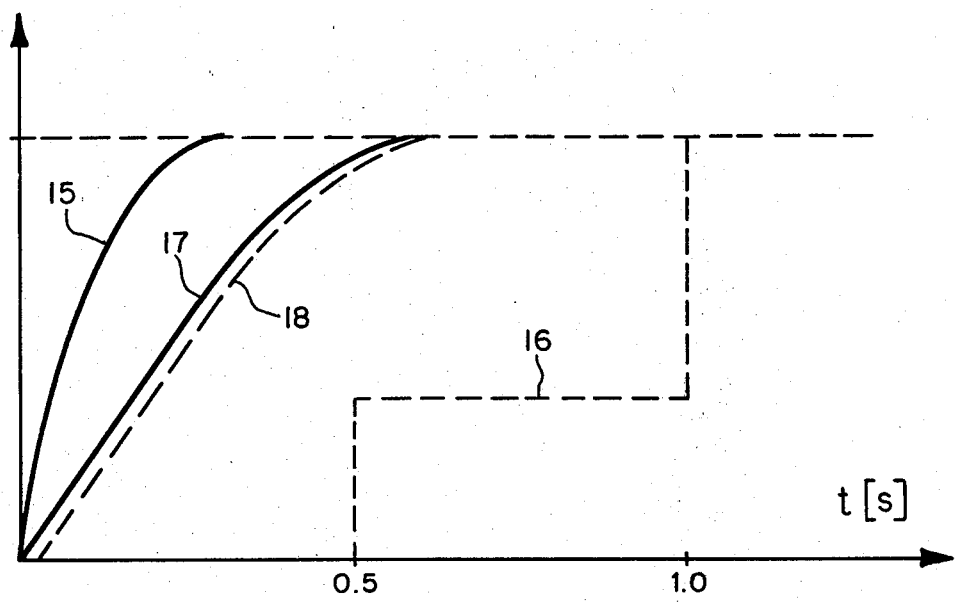
FIG. 3 is a graph comparing the mechanical and display responses to a sudden load for the balances in FIGS. 1 and 2.

The above-described widely used technique has an analog control circuit with principally proportional behavior and only in the display circuit does an integration over time take place. A precision compensation balance equipped with such a control circuitry shows relatively undesirable behavior. FIG. 3 explains the typical response of the display of such a balance to a sudden load. The reaction of the mechanical system is nearly immediate as curve 15 shows. Due to its long integration time the display can only follow after 0.5 sec. as curve 16 shows. Very often, the display will become stable only after 1 sec. Weighing with such a display is thus quite uneasy. Since the counting frequency for the counter cannot be driven over a certain limit, the counting periods (also called integration or latch periods) have to be chosen around 0.5 sec., still not long enough for guaranteeing a stable display. If such balances have to be used on vibrating tables, or if the load to be weighed is unstable itself (living animals), still longer integration periods have to be chosen. If the main application of the balance is for weighing in powders or liquids, as it very often is, the display changes at least every two sec. but twice a second at most and this discontinuance of the display hinders work severely. The user becomes tired fast and weighing times become very long.

Figure 2:
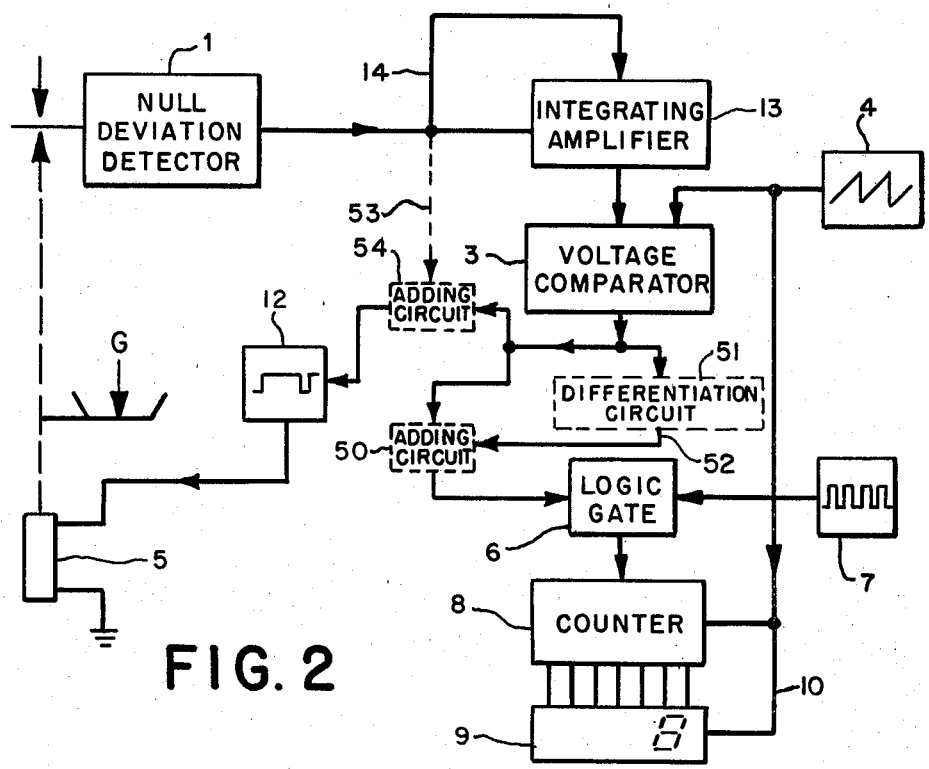
FIG. 2 is a schematic of the preferred analog embodiment of the present invention.

Referring now to FIG. 2, an analog emdodiment of the present invention is shown. Parts of this drawing which are equivalent to parts in FIG. 1 bear the same numbers. The amplifier 13 is an integrating amplifier. Thus, this circuit uses integrating control means to produce compensation pulses. In practical solutions, the amplifier 13 would possibly be a calculating circuit. The amplifier's integrating constant can be modified dependent on the amount of the null deviation of the coil 5 from its original equilibrium null position. The modification takes place over the connection 14. The position signals delivered by the null-deviation detector 1 are being integrated constantly by the amplifier 13 being situated in the main control circuit and the result is being fed to the voltage comparator 3. The voltage comparator 3 produces compensation pulses whose widths are a function of the integral of the position signals. The compensation pulses are used to switch the constant current source 13, just as in FIG. 1.

Dependent on the amount of the null-deviation, the integration constant can be automatically changed over control line 14. A larger integration constant results from large null-deviations and smaller or very small integration constants result when the coil is close to the null position. This enables the system to make a fast response to large deviations as well as a small reaction to vibrations. In this manner, circuits can be designed, which guarantee an absolutely stable display even on the exposure of the balance to severe vibrations and disturbances.

According to FIG. 2, the counter 8 and the display unit 9 can be controlled immediately by the output of the saw-tooth generator 4. The frequency divider used in FIG. 1 can be omitted because of the integration which has already been carried out in the control circuit itself. A very stable number of pulses is being delivered from the control circuit into the logic gate 6 during each pulse delivered by the saw-tooth generator 4. Thus, a stable display is achieved without the necessity of any further integration. Since the necessary integration has already taken place in the control circuit, major improvements have been achieved. The balance of the present invention shows a characteristic response according to curve 17 and 18 in FIG. 3. The mechanical response 17 to a sudden load is clearly slower than the response of the conventional circuit of FIG. 1. But, the mechanical response 17 is followed almost immediately by the display 18, which can change about every other millisecond. Thus, the weighing-in of powders and liquids is much faster and less tiresome. Also, the display can be watched as it continuously changes approaching the final value. Use of such balances in automatically controlled processes can save substantial amounts of process time.

An additional adding circuit 50 can be bound into the control circuit, for example, before the gate 6 supplying the display. A modification signal can be added to or subtracted from the compensation pulses in the adding circuit 50 over the line 52 thereby enlarging or shortening the pulse width. The modification signal is generated by a differentiation circuit 51 which differentiates the compensation pulses as they are received from the voltage comparator 3. Thus, the modification signal is proportional to the rate of change of the compensation pulses. An optical advance of the display as against the actual value generated in the control circuit is thus simulating a higher weight than actual, dependent on the rate of change of the display. The common overshoot effect of weighing-in jobs is eliminated.

A truly integrating behavior of the control circuit does not always cause optimal dynamic behavior of the system. It has therefore proved advantageous that a proportional part be added in the control circuit which does not affect the display. The proportional part which is immediately gained can be added to the compensation pulse in the adding circuit 54 thus forming an integrational-proportional-control.

Instead of making automatic variability of the integration constant of the integrating amplifier 13 dependent on the amount of the null deviation, the variation can also be made dependent on how the null deviation varies with time.

Figure 4:
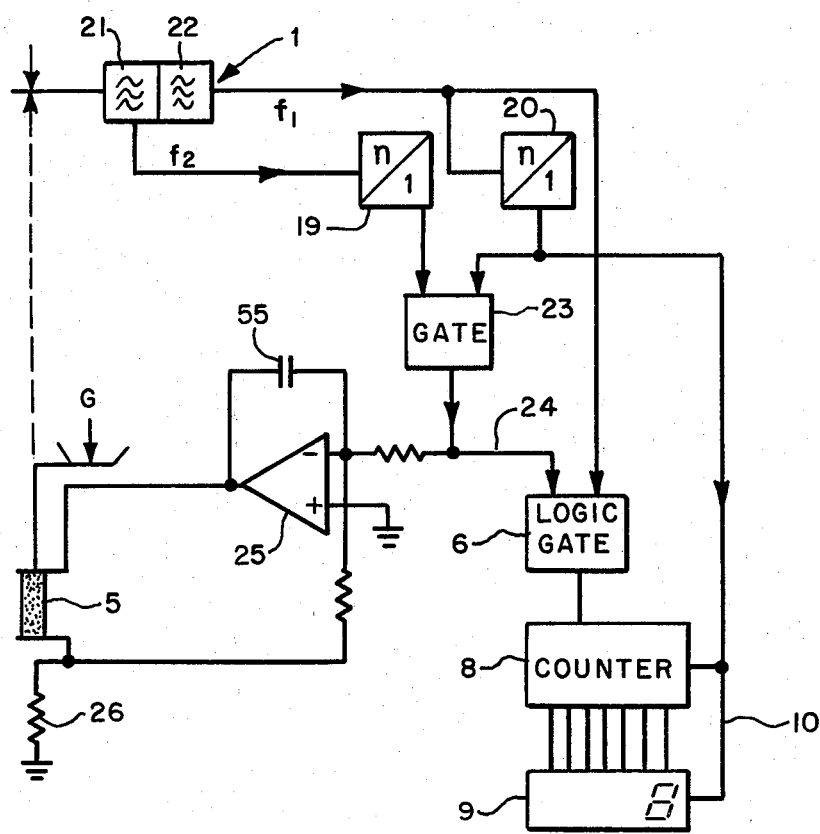
FIG. 4 is a schematic of a preferred digital embodiment of the invention.

FIG. 4 shows a system which can be realized extremely simply and cheaply. The system's control circuit is largely digital in its operation. Here the null deviation detector 1 includes means designed for generating a position signal whose frequency is dependent on the null deviation. For this purpose, an oscillator 21 is designed into the null deviation detector 1. The output frequency of the oscillator 21 is variable with the mechanical movement of the coil 5. Fixed frequency pulse signals are generated by a second oscillator 22. These pulse signals have the same frequency as the frequency from the oscillator 21 when the coil 5 is in the null position. The frequency has an order of magnitude of 1 MHz. Preferably, both oscillators 21 and 22 are constructed identically and positioned close to each other, so that temperature changes and component aging will influence the output frequencies almost equally.

The output signals of these oscillators 21 and 22 are sent into an integrating control means to produce compensation pulses. The frequencies of the signals are divided down by two frequency dividers 19 and 20 set to the same dividing factor. The dividers may be simple electronic counters. The dividers both supply divided frequency signals to an electronic gate 23. This gate 23 compares the phase of the divided frequency signals from the frequency dividers 19 and 20 to generate compensation pulses. This is an integration of the signals from the null deviation detector 1, because the phase of each pulse on the frequency divided signals is an average of the phases of many pulses from the undivided position or fixed frequency signals. The compensation pulses generated by gate 23 are delivered over connection 24. The pulses will have a frequency dependent on the dividing rate of the dividers 19 and 20. The pulses will be longer or shorter depending on the frequency difference between the oscillators 21 and 22. The gate 23 thus functions similarly to the voltage comparator 3 of the analog embodiment by generating compensation pulses whose pulse widths are dependent on the integral of the position signals. The compensation pulses on connection 24 are used to generate a compensation current for the coil 5 over an amplifier 25. The compensation pulses control a conversion means for producing a display signal. The conversion means includes a gate 6 and a counter 8. In this embodiment the counting frequency is provided by oscillator 22. The gate 6 in this embodiment immediately switches the pulse signals from the fixed oscillator 22, thus generating counting pulses. The display unit 9 works as it did in the embodiment of FIG. 2 in response to the display signal from counter 8. Reset of the counter 8 and latch of the display 9 are carried out on connection 10, in this embodiment immediately dependent on the output frequency of the divider 20. Depending upon the desired resolution of the system, this output frequency will be about 1 kHz.

FIG. 4 explains how the coil current can be controlled to a precise value independent of external influences. By using circuit means with a summing point amplifier 25 and a measuring resistance 26 connected in series to coil 5, a constant coherence between the coil current and the display can be guaranteed. A measuring voltage proportional to the coil current can be measured over resistor 26. The measuring voltage is compared with the compensation pulse voltage on connection 24 by summing the currents generated by both voltages over 2 resistors on the summing point of the summing point amplifier 25. Thus, coil 5 is bound into an additional control circuit and the coil current is always kept at a value determined by the width of the compensation pulse on connection 24. In addition, it has also been proved advantageous to extend the function of this summing point amplifier 25 to that of a Miller integrator by adding a capacitor 55 across the amplifier 25 and thus achieving a smoothening of the voltage fed to the coil 5. When employing the Miller integrator, the pulses generated by the phase comparing gate 23 have to be of negative polarity and gate 6 must perform accordingly.

Figure 5:
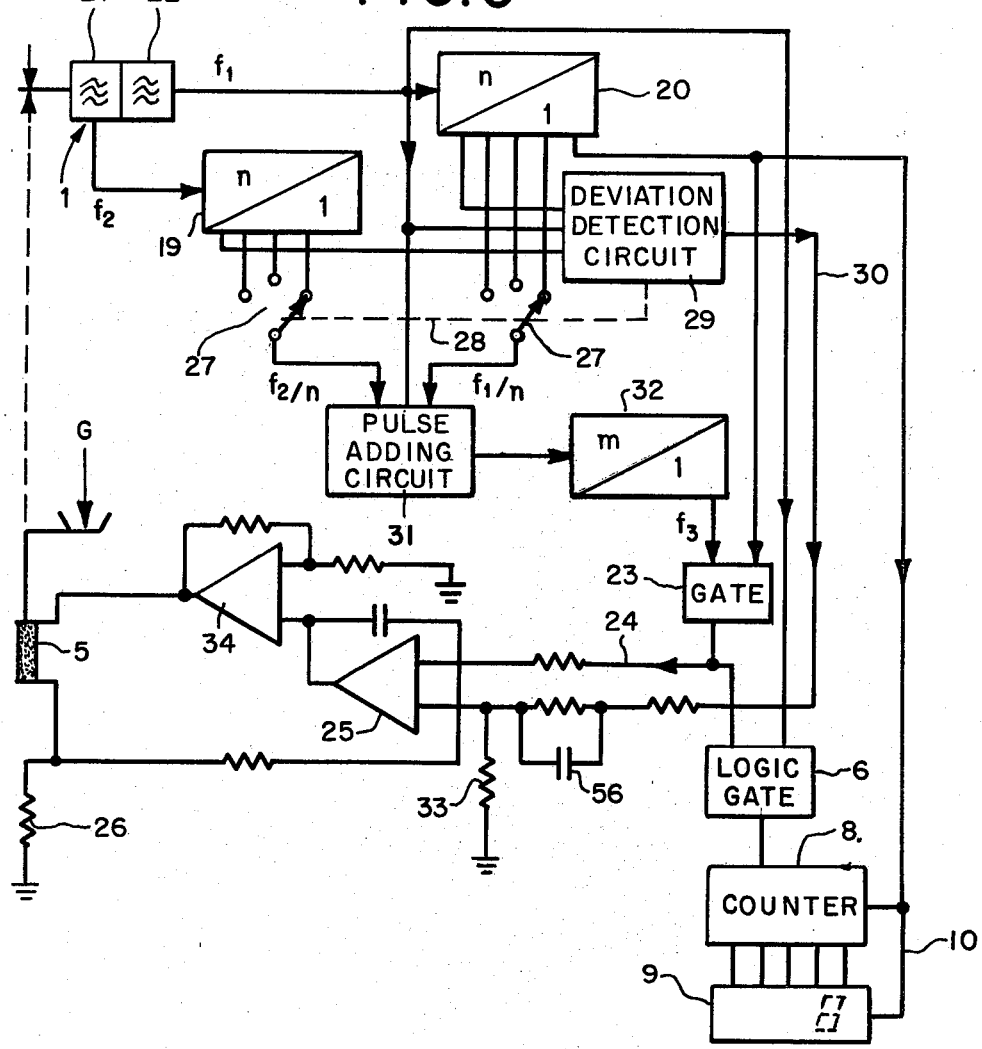
FIG. 5 is a schematic of a second preferred digital embodiment of the invention.

Referring now to FIG. 5, the control depends on the phase shift between the output frequencies of the oscillator 21 and 22, as in FIG. 4. These circuits show a truly integrating behavior. The frequency dividers 19 and 20 are necessary to gain a digital resolution.

The arrangement in FIG. 5 has a deviation detection circuit 29 for evaluating the null deviation. The deviation detection circuit 29 generates an analog null deviation signal on connection 30 whose voltage is roughly proportional to the null deviation of the system and also generates a switching signal for the switches 27 added to the frequency dividers 19 and 20 as schematically shown by connection 28. By these switches 27 the dividing factor of the dividers 19 and 20 can be changed.

Figure 9:
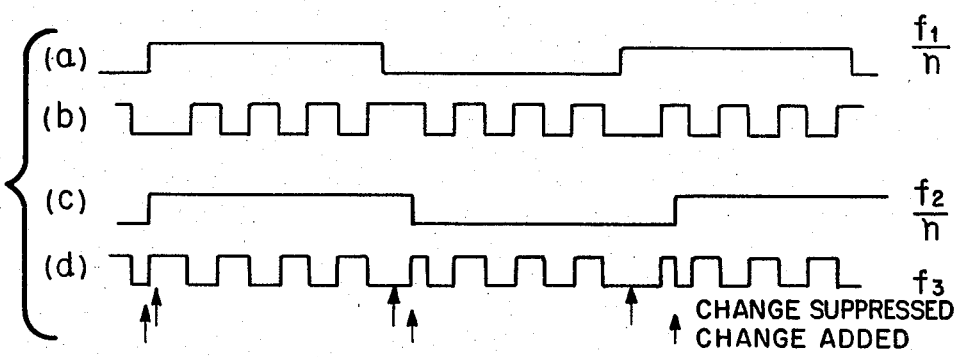
FIG. 9 is a graph of the inputs and output of the pulse adding circuit of the embodiment in FIG. 5.

Over the switches 27, the dividers 19 and 20 are connected to a pulse adding circuit 31, which is also supplied with the fixed frequency pulse signals from the oscillator 22. The pulse adding circuit generates the variable frequency, f 3, using the fixed frequency, f 1, of the pulse signals, by means of regularly suppressing the polarity change of the pulse signals at each polarity change of the frequency divided signal, f 1/n, from frequency divider 20 as shown in FIGS. 9a and 9b, and by adding polarity changes at each polarity change of the frequency divided signal, f 2/n, from frequency divider 19, as shown in FIGS. 9c and 9d. The variable frequency signal from the pulse adding circuit 31 is fed into a third frequency divider 32. The gate 23 receives and compares the frequencies of the signals from the dividers 20 and 32 concerning their phase difference, just as it did with the dividers 19 and 20 in FIG. 4. The compensation pulse chain is generated by gate 23 over connection 24. The third frequency divider 32 receives pulses from the pulse adding circuit 31, the frequency of which, f 3, has an offset to the fixed frequency f 1 of the oscillator 22, which is only a specific, constant part of the offset of the original variable frequency f 2 delivered by the oscillator 21 against the fixed frequency f 1. Thus, the actual deviation of coil 5 from null, which is sensed by detector 1, is divided down by a specific factor, which can be chosen by modifying the dividing factor of the frequency dividers 19 and 20 using switches 27. As the switches 27 themselves are being actuated dependent on the null deviation detection circuit 29, the variation of the phase difference between the frequencies delivered by dividers 20 and 32, with time will be less by a certain factor than it would be, if the divider 32 was fed with f 2 directly. Thus, the integration constant can automatically be adjusted to the null deviation of the coil 5, such that for small deviations sensed by the detector 1 the circuit will be adjusted to a slow integration control, and for more extensive deviations, it will be adjusted to relatively fast integration.

FIG. 5 explains that even in this largely digital solution the actual coil control circuit does not need to be designed as a purely integrational control, but that proportional control can be added though not affecting the display. The null deviation evaluation circuit 29 delivers, as stated before, an analog null deviation signal which is proportional to the null deviation, on connection 30. This can immediately be added to the compensation pulses at amplifier 25. The voltage variation appearing at resistor 33 shifts the bias of the amplifier 25 adequately and thus adds the desired proportional part of the compensation pulse. By adding a capacitor 56 to the resistor in line 30 as depicted, a differential part can even be added. The control would then be additionally controlled in part by the rate of change of the null deviation of the coil.

FIG. 5 shows how coil 5 can be supplied with a voltage instead of a current by adding voltage control means comprising amplifier 34 to the circuit. This amplifier 34 acts as a voltage source. By delivering voltage with the source resistance zero, the amplifier 34 appears as a dynamic short to the coil 5. The value of the voltage is determined by the output of the amplifier 25. Vibrations of the balance itself or the objects to be weighed will cause movement of the coil 5 in the magnetic field and thus induce small voltage changes across the coil. The precisely controlled voltage at the output of amplifier 34, or in other words, the dynamic short tends to dampen the movement of the coil. Thus, the balance will be much more intensive against vibration than it would be if it had a coil supplied with current. This is so, especially, if the amplifier 34, by well known means, is given a negative source resistance. Of course, the sum of the source resistance and the coil resistance must never become less than zero for obvious reasons. Another advantage of the coil voltage control of FIG. 5 is that variations of the coil resistance will not result in errors in the current.

An important feature of force measuring equipment is the resolution one can attain. The digital control system shown in FIGS. 4 and 5 use simple means to increase their resolution.

The frequencies, delivered by the oscillators 21 and 22, which have to be processed by the frequency dividers 19 and 20 and the display 8, cannot be chosen carelessly. The upper limit in measuring equipment, where power consumption is to be kept low, is around 1 MHz. The dividing ratio of divider 20 determines the frequency of the compensation pulse chain generated by gate 23 on line 24, which is also the ripple frequency of the coil voltage. The lower limit for this frequency is around 300 Hz. The ratio between the output frequency of the compensation pulse chain to the fixed frequency of the pulse signals from oscillator 22 is the genuine resolution of the system.

Of course, the overall resolution can be improved by counting not only over one compensation pulse but over a larger number in counter 8 as was explained in the conventional system of FIG. 1. There the saw-tooth frequency was divided in a frequency divider 11 and the counting pulses from square wave generator 7 were summed up to a mean value over a larger number of saw-tooth cycles. Accordingly, one could, turning back to FIG. 5, add a frequency divider in connection 10. It is, however, a specific advantage of the invention, that the display can be generated frequently and not only every half second. So, different means for increasing the resolution had to be found.

Figure 6:
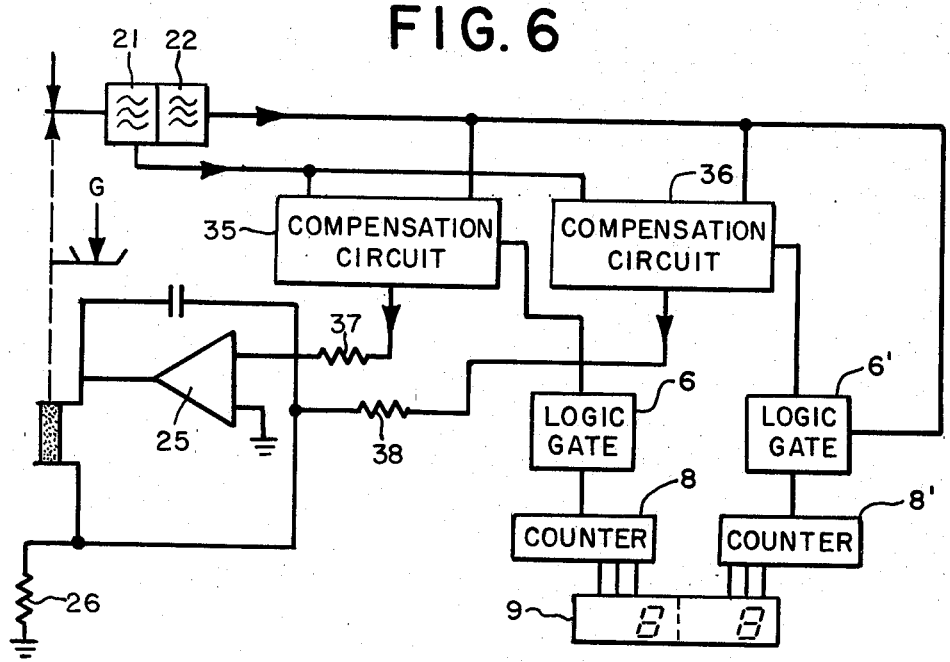
FIG. 6 is a schematic of a third digital embodiment of the invention which improves upon the resolution of the balance of FIG. 5.

In FIG. 6, a solution for the improvement of the resolution is shown. Two specific circuits 35 and 36 are combined. They each contain circuitry as shown in FIG. 5, namely the basic circuit together with a pulse adding circuit. The overall compensation current at the summing point of amplifier 25 is generated by the output of the circuits 35 and 36 over the resistors 37 and 38 where the resistor 38, for example, has ten times the resistance of the resistor 37. The dividing factors of the frequency dividers in the circuit 36 and the pulse adding circuit (in detail explained in FIG. 5) in circuit 35 are adjusted such that the circuit 35 generates a certain raw value while circuit 36 generates a certain fine value which are added to the summing point of the amplifier 25. As before, the circuit 35 controls a gate 6 which delivers a certain pulse chain to the counter 8 determining the upper part of the display and similarly circuit 36 and 6' together with the counter 8' determine the lower part of the display 9.

Figure 7:
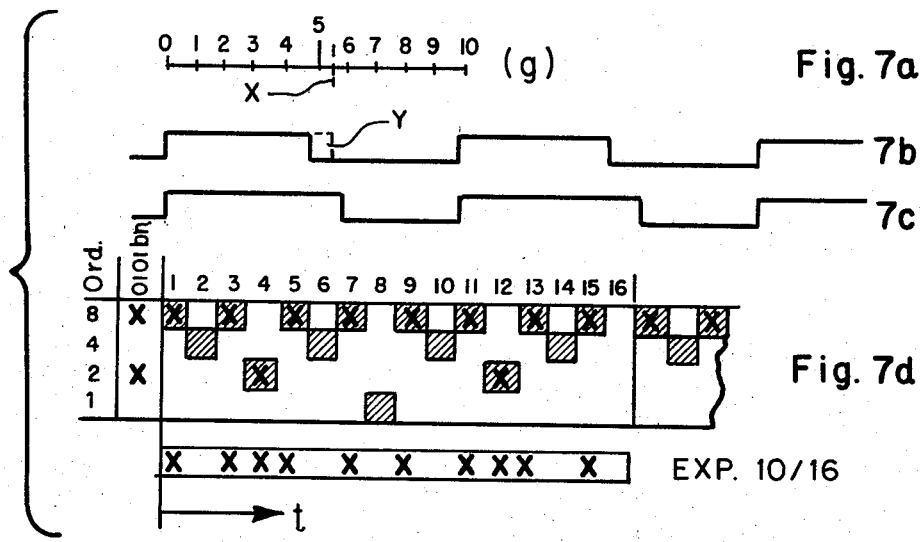
FIG. 7 is a graph of the compensation pulses produced in the present invention to aid in the explanation of the improved resolution of the invention.

An even simpler way to realize a higher resolution is explained according to FIG. 7. For simpler understanding, FIGS. 7a and 7c are drawn as if the genuine resolution would be only 10. Actually in all practical designs the genuine resolution would be much higher. According to the embodiments described above with about 1 MHz for the fixed frequency of the detector 1 and a compensation pulse chain frequency of 300 Hz, one can calculate a genuine resolution of about 3333. In the digital embodiments this would be equivalent to the value of the dividing factor in the frequency dividers 19 and 20. FIG. 7a shows the scale of singular values which a balance of the unrealistically low resolution of 10 could display. The display would, for example, be just one 7-segment-device displaying figures between 0 and 9. Assuming further that the balance has a maximum load of 10 grams, any weight between 0 and 9 grams could be displayed in steps of one gram. It is very important that also the control could only generate pulses for controlling the coil in full 1 gram steps. The self-regulation of this balance would, of course, almost always alternate between two positions and also the display would alternately show two figures because of the equivalently poor resolution of the display. FIG. 7b displays the compensation pulse chain for 5 grams, while FIG. 7c displays the same pulse chain but for 6 grams. Assuming that the weight of the load on the balance is 5.5 grams, (marked by "X" in FIG. 7a) control and display would alternatively change from value 5 to value 6 and vice versa. In order to avoid this effect at least in the control in this specific example a pulse of one half increment would have to be added ("Y" in FIG. 7b) which is impossible since an increment is indivisible. FIG. 7 now explains that the mean value 5.5 grams simply can be realized by alternatively generating a compensation pulse for 5 grams and a compensation pulse for 6 grams. The mean value of such a pulse chain of pulses which differ by one increment of the genuine resolution is a value of 5.5 grams and this value will be produced in the embodiment of FIG. 4 by the smoothing effect caused by capacitor 55 connected over amplifier 25. When this value is fed to the coil, the alteration of the control would stop. Thus, the genuine resolution of the system has been improved by the factor of 2. Following this principle, however, one can increase the resolution to a far higher extent. One could, for example, form subsequent groups of four pulses to a pulse chain and make three pulses the value of 5 and one pulse the value of 6 and, thus, generate a mean value of 5.25 grams and, at the same time, increase the genuine resolution by the factor of 4. By means of feeding amplifier 25, capacitor 55, and the coil 5 with a chain of pulses differing just by one increment on the genuine resolution in a specific time pattern any desired value in any desired resolution can be realized.

Figure 8:
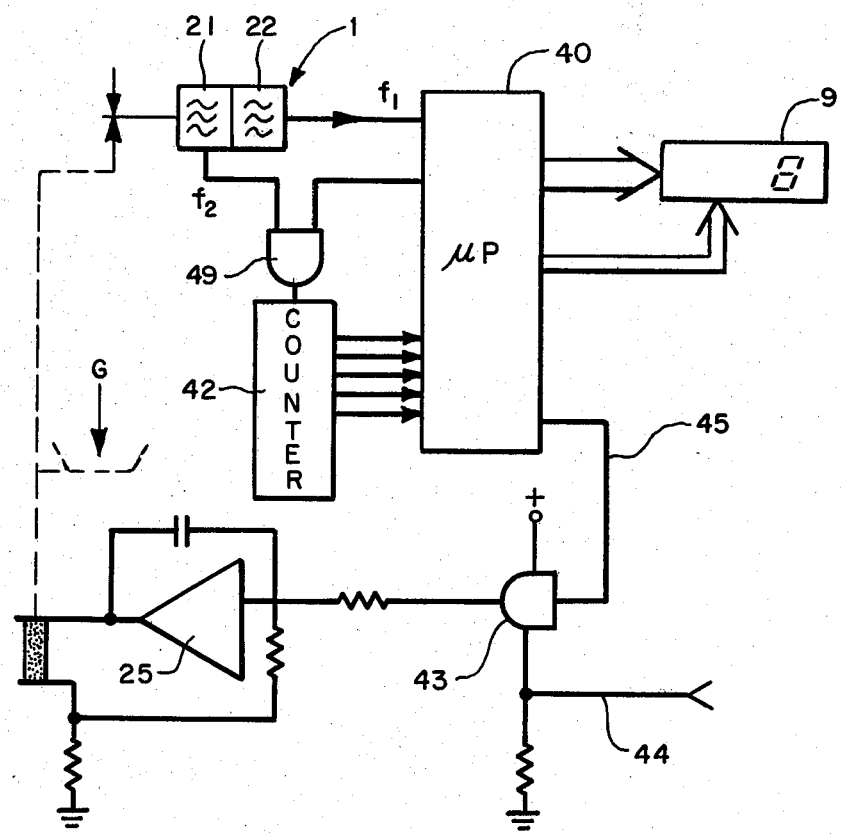
FIG. 8 is a schematic of a preferred microprocessor embodiment of the present invention.

An extremely simple solution of this problem of increasing the genuine resolution is possible with a microprocessor 40 as shown in FIG. 8. The microprocessor 40 produces compensation pulses on connection 45. Now it is very easy to determine the pulse width for any of the subsequent pulses generated on connection 45 following the pattern of FIG. 7d. It is assumed that the genuine resolution should be increased by the factor of 16. Again the detector 1 delivers information about the deviation of the mechanical system. The microprocessor 40 or the calculating routines programmed into it suggest a pulse width to be output on connection 45. Of course, the calculated value is much more precise than can be used for the limited genuine resolution. The microprocessor 40 being dependent on the clock frequency for which the fixed frequency of the detector 1 is used, can only deliver pulses to connection 45 measurable in whole increments. Consequently, the value is calculated, which can be given out in integer increments to connection 45. The fraction is given out in the way described in the previous paragraph.

In order to further clarify the process, FIG. 7d gives a general pattern for the increase of the resolution by a factor of 16. This could as well have been shown for the factor of 8 or any other factor. The specific example in FIG. 7d is for the binary number of 1010 equivalent to 10/16 to be put on the line 45. Assuming that the pulse value of 1000+10/16 is to be put on connection 45 then the microprocessor 40 will split this value. It will output pulses 1000 increments in length on line 45 and prolong the first, third, fourth, fifth, seventh, ninth, eleventh, twelfth, thirteenth and fifteenth pulse in every sixteen-pulse-output cycle by just one increment as the crosses show in the bottom bar of FIG. 7d. This is achieved in the program just by comparing the desired binary figure, the binary 1010 in our example which is represented by crosses at the positions 2 and 8 in the left column of FIG. 7d, with the squared positions under the number in the upper line of FIG. 7d corresponding to the pulse count in a 16-pulse-cycle. It is easy to see that for example the internal instruction to output one half increment more on line 45 would lead to the addition of one increment in every second pulse. Any possible binary figure chosen is represented exclusively by a single pulse-output-pattern. It is easy to alter the scheme to any other desired length of binary figure and its resulting factor of resolution. It should be noted, that one could, of course, use other patterns. It would, for example, be possible to represent 1000+½ by five subsequent normal pulses of 1000 increments and another five subsequent prolonged pulses but that the pattern shown in FIG. 7d is the preferred solution as far as fast response of the control is concerned. In the preferred pattern a change in the most significant bit will become effective after the second pulse. The information which changes only every sixteenth pulse is that of the least significant bit. Also, although this pattern is in cycles of 16 subsequent pulses, the binary word may change any time during a cycle. The rapidness of the effect of such a change is clearly related to the significance of the change which is very important in order to keep the control response fast.

Often, it is sufficient to increase the resolution of the control system and not the display. The higher the resolution of the control system as compared to that of the display, the more stable the last digit of the display will be. But it is also possible to use the higher resolution for adding another digit to the display. This only requires transforming the information which is used for generation of the pulse pattern, into an adequate signal for the additional digit(s) in the display.

In FIG. 8, a microprocessor embodiment is shown. A microprocessor 40, adequately programmed, is clocked by the fixed frequency generated by the oscillator 22. The variable frequency position signals of the oscillator 21 which is dependent on the null deviation of the mechanical system pass a gate 41 and clock a counter 42. The microprocessor interrupts the counting through gate 41 for the time it takes over the data from counter 42. The accumulated result in the counter 42 is a measure of the deviation of the mechanical system. The microprocessor 40 reconstructs the null deviation by processing a succession of counter values in an adequate program. In effect, the microprocessor 40 is taking the integral of the position signals over a time period to determine a mean value for the null deviation. This deviation value is then used to produce compensation pulses for controlling the mechanical system and to display the value of the load on the system. The display 9 is used as described before. The purely technical solution may or may not comprise special drivers, multiplexing, etc., which is solely dependent on the type of display used and other subordinate details.

The microprocessor 40 delivers the compensation pulses at its timer/counter output 45. The internal timer/counter can be programmed to deliver a compensation pulse which can be any number of clock frequency pulse widths wide. A CMOS-buffer 43 transforms the pulses to those of a precisely controlled voltage. The pulses can be slightly influenced through the connection 41 in order to correct certain errors which are not being corrected in the microprocessor 40 such as errors of the magnetic field, temperature changes, etc. Of course, such errors can be corrected in the same way if one adds the necessary parts to the circuits according to FIGS. 2, 4, 5 or 6.

In order to inform the user of the balance about the completion of an adjustment, at least a part of the display is darkened while the control circuit is restoring to null position. The device may be designed to darken the whole display or only the figures which are still changing. In order to detect the completion, the display itself or any other value it is dependent on is electronically supervised. The whole display or a part of it is darkened for as long as the system is still in motion. The display is brightened when the displayed value can be considered valid, in other words, after the fluctuation of the value has been less than a predetermined value for a predetermined time.

Another circuit may be used to provide a further advantageous development of the invention. If after a self-restoring process of the control system the display fluctuates around a final value, the integration constant of the control can be modified to get a completely stable display. This modification of the integration constant can be kept until the system moves indicating a change of the load or another disturbance of the control system. This technique would always guarantee a stable display, even if the balance is placed on a ground carrying extreme mechanical vibration or if living animals or other vibrating material is to be weighed. This technique can be used on other devices even if not covered by other parts of this invention. It is, for example, possible to control the integration time in a conventional balance in this matter.

For the control system explained above a linear function between coil current and force is desirable. Conventional permanent magnet systems have certain disadvantages. According to a further development of the invention, the moving coil 5 should therefore be situated in an air gap between two radial magnets which are at least partly made of cobalt-samarium. The cobalt-samarium should be preferably be placed in immediate contact with air gap. The excellent physical qualities of this magnet made of cobalt, samarium and other rare earth materials guarantee an optimal field concentration. This is the reason for the very good linear features on the overall system.

If the reference frequency and the variable frequency f 1 and F 2 of the null deviation detector do not drift in the same direction, this may have erroneous consequences. The coil would then be moving down or up a little and taking a new null position. This may result in a different current/force factor of the coil-magnet-system. Therefore, it is desirable to have as little inhomogeneity in the field around the coil as possible. This can be achieved very well by specifically shaping the cobalt-samarium close to the air gap. For example, one or more radial grooves in the magnet poles will greatly improve the overall homogeneity of the field around the coil. Thus, the air gap can be made much shorter than usual without sacrificing linearity which saves space and cost. Of course, it is also possible to use a counter-pole of ordinary iron and only one cobalt-samarium ring. It is then possible to put the distortion grooves into the iron pole and still benefit substantially.

Though the embodiments described and disclosed above are preferred, other embodiments and refinements which do not depart from the true spirit and scope of the present invention may be conceived by those skilled in the art. It is intended that all such embodiments and refinements be covered by the following claims.

We claim:

1. A device for measuring forces comprising:
   a coil that moves in a magnetic field in response to the forces being measured;
   null deviation detector means, coupled to said coil, for producing position signals corresponding to the difference in position of said coil from a null position;
   integrating control means, coupled to said null deviation detector means, having a variable integration constant for integrating said position signals to produce a compensation pulse;
   means for varying the integration constant dependent upon the position of said coil, such that a large deviation of said coil from said null position would cause a large integration constant and a slight deviation of said coil from the null position would cause a small integration constant;
   means, coupled to said integrating control means, for restoring said coil to said null position in response to said compensation pulse;
   conversion means, coupled to said integrating control means; for converting said compensation pulse into a display signal indicating the numerical value of the forces being measured; and
   a display unit for displaying the numerical value of the forces being measured in response to said display signal.

2. A device for measuring forces comprising:
   a coil that moves in a magnetic field in response to the forces being measured;
   null deviation detector means, coupled to said coil, for producing position signals corresponding to the difference in position of said coil from a null position;
   integrating control means, coupled to said null deviation detector means, having a variable integration constant for integrating said position signals to produce a compensation pulse;
   means for varying the integration constant dependent upon the rate of change of the position of said coil;
   means, coupled to said integrating control means, for restoring said coil to said null position in response to said compensation pulse;
   conversion means, coupled to said integrating control means, for converting said compensation pulse into a display signal indicating the numerical value of the forces being measured; and
   a display unit for displaying the numerical value of the forces being measured in response to said display signal.

3. The device of claims 1 or 2 wherein said integrating control means includes an integrational amplifier.

4. The device of claims 1 or 2 wherein said null deviation detector means includes means for generating position signals whose frequency is dependent on the difference in position of said coil from said null position, and wherein said integrating control means includes means for comparing the position signals with signals of fixed frequency.

5. The device of claim 4 wherein said null deviation detector means further includes:
   a frequency generator for producing said signals of fixed frequency.

6. A device for measuring forces comprising:
   a coil that moves from an equilibrium null position in a magnetic field in response to the forces being measured;
   null deviation detector means, coupled to said coil, for producing position signals whose frequency is dependent on the position of said coil;
   first frequency divider means, coupled to said null deviation detector means, for receiving said position signals therefrom, and for dividing the frequency of said position signals by a factor to produce first frequency divided signals;
   a frequency generator for producing pulse signals at a fixed frequency;

second frequency divider means, coupled to said frequency generator for receiving said pulse signals therefrom, and for dividing the frequency of said pulse signals, by the same factor as that used by said first frequency divider means, to produce second frequency divided signals;

gate means for producing a compensation pulse having a pulse width determined by a comparison of the frequencies of said first frequency divided signals and said second frequency divided signals;

conversion means for converting said compensation pulse into a display signal indicative of the numerical value of the forces being measured;

a display unit, coupled to said conversion means, for displaying the numerical value of the forces being measured upon receipt of said display signal; and circuit means, coupled to said gate means, for delivering current to said coil to restore said coil to said null position upon receipt of said compensation pulse.

7. The device of claim 6 wherein said circuit means includes:
a summing point amplifier having a summing point which is coupled to said gate means and to a measuring voltage proportional to the current in said coil, said summing point amplifier also having an output.

8. The device of claim 7 further comprising:
a measuring resistor connected in series to said coil, whereby said measuring resistor produces the measuring voltage proportional to the current in said coil.

9. The device of claim 6 wherein said circuit means includes a Miller integrator.

10. The device of claim 7, 8, or 9, further comprising:
a capacitor, connected between the summing point and the output of said summing point amplifier, for averaging successive compensation pulses so that the current in said coil is determined at a higher resolution than the resolution of the compensation pulses.

11. The device of claim 6 further comprising:
voltage control means, receiving the current from said circuit means, for delivering a voltage to said coil so that the movement of said coil is dampened.

12. The device of claim 11 wherein said voltage control means includes:
a voltage source with a zero impedance.

13. The device of claim 11 wherein said voltage control means includes:
a voltage source with a negative impedance.

14. A device for measuring forces comprising:
a coil that moves from an equilibrium null position in a magnetic field in response to the forces being measured;
null deviation detector means for producing position signals whose frequency is dependent on the position of said coil;
first frequency divider means, coupled to said null deviation detector means, for receiving said position signals therefrom and for dividing the frequency of said position signals by a factor to produce first frequency divided signals;
a frequency generator for producing pulse signals at a fixed frequency;
second frequency divider means, coupled to said frequency generator, for receiving said pulse signals therefrom and for dividing the frequency of said pulse signals by the same factor as that used by said first frequency divider means to produce second frequency divided signals;

means for automatically selecting said factor for said first and second frequency divider means dependent on the position of said coil;

pulse adding circuit means, receiving said pulse signals, said first frequency divided signals and said second frequency divided signals for generating variable frequency signals by suppressing changes in polarity of said pulse signals in response to changes in polarity of said first frequency divided signals and adding changes in polarity to said pulse signals in response to changes in polarity of said second frequency divided signals;

gate means for producing a compensation pulse whose length is dependent on a comparison of said variable frequency signals and said second frequency divided signals;

circuit means, coupled to said gate means, for receiving said compensation pulse and for delivering current to said coil to restore said coil to said null position;

conversion means, coupled to said gate means, for converting said compensation pulse into a display signal indicative of the numerical value of the forces being measured; and a display unit, coupled to said conversion means, to display the numerical value of the forces being measured in response to said display signal.

15. The device of claims 6 or 14 wherein said conversion means includes:
counter means for counting the number of pulses from said pulse signals which occur during each compensation pulse.

16. The device of claim 6 further comprising:
means for generating a null deviation signal proportional to the difference between the position of said coil and said null position in response to said pulse signals and said first and second frequency divided signals, for delivery to said circuit means thereby achieving proportional in addition to integrational control of said coil.

17. The device of claim 14 further comprising:
means for generating a null deviation signal proportional to the difference between the position of said coil and said null position in response to said pulse signals and said first and second frequency divided signals, for delivery to said circuit means, thereby achieving proportional in addition to integrational control of said coil.

18. The device of claims 16 or 17 further comprising:
means for differentiating said null deviation signal to produce a differential signal and delivering said differential signal to said circuit means.

19. The device of claim 6 further comprising:
deviation detection circuit means including,
means for generating a null deviation signal proportional to the difference between the position of said coil and said null position, in response to said pulse signals and said first and second frequency divided signals,
means for delivering said null deviation signal to said circuit means, thereby achieving proportional in addition to integrational control of said coil, and
means for controlling the factor used in said first and second frequency dividers in response to said pulse signals and said first and second frequency divided signals.

20. The device of claim 14 further comprising:
deviation detection circuit means including,
means for generating a null deviation signal proportional to the difference between the position of said coil and said null position, in response to said pulse signals and said first and second frequency divided signals,
means for delivering said null deviation signal to said circuit means, thereby achieving proportional in addition to integrational control of said coil, and
means for generating a switching signal, in response to said pulse signals and said first and second frequency divided signals, for delivery to said means for automatically selecting said factor.

21. The device of claims 1, 2, 6 or 14 further comprising:
differentiation circuit means, receiving said compensation pulse, for producing a modification signal proportional to the rate of change of the compensation pulses; and
adding circuit means, coupled to said differentiation circuit means, for adding said modification signal to said compensation pulse to produce a modified compensation pulse and for delivering said modified compensation pulse to said conversion means, thereby advancing the display dependent upon the rate of change of the forces being measured.

22. The device according to claims 1, 2, 6 or 14 further comprising:
means, coupled to said display unit, for detecting display signals indicating a fluctuating display value and for darkening at least part of said display unit until the thus detected fluctuation has been less than a predetermined value for a predetermined time.

23. The device of claims 1, 2, 6, or 14, further comprising:
means for mechanically coupling said null deviation detector means to said coil.

24. The device of claims 1, 2, 6, or 14, wherein the magnetic field is created by a permanent magnet system comprising:
a radial magnetized ring surrounding an air gap through which said coil moves, said magnetized ring containing cobalt-samarium.

25. The device of claims 1, 2, 6, or 14, wherein the magnetic field is created by a permanent magnet system including:
at least two magetized rings surrounding an air gap, said rings containing cobalt-samarium which is in contact with the air gap.

26. The device of claims 1 or 2, 6, or 14, wherein the magnetic field is created by a permanent magnet system including:
magnetized rings surrounding an air gap, positioned and shaped so that the magnetic field is homogeneous around said coil, said magnetized rings containing cobalt-samarium.

27. A device for measuring forces comprising:
a coil that moves in a magnetic field in response to the forces being measured;
null deviation detector means, coupled to said coil, for producing position signals dependent upon the difference in position of said coil from an equilibrium null position;
microprocessor means, coupled to said null deviation detector means, for producing a compensation pulse dependent on the integral of the position signals and for producing a display signal indicative of the numerical value of the forces being measured, said microprocessor means including timer/counter means for producing the compensation pulse;
circuit means, receiving said compensation pulse from said microprocessor means, for delivering current to said coil to restore said coil to said null position; and
a display unit for displaying the numerical value of the forces being measured in response to said display signal.

28. A device for measuring forces comprising:
a coil that moves from an equilibrium null position in a magnetic field in response to the forces being measured;
null deviation detector means, coupled to said coil, for producing position signals whose frequency is dependent on the position of said coil;
a frequency generator for producing fixed frequency signals;
microprocessor means, clocked by said fixed frequency signals, for producing a compensation pulse dependent on the integral of the differences between the frequencies of said position signals and said fixed frequency signals, and for producing a display signal indicative of the numerical value of the forces being measured, said microprocessor means including timer/counter means for producing the compensation pulse;
circuit means, receiving said compensation pulse from said microprocessor means, for delivering current to said coil to restore said coil to said null position; and
a display unit for displaying the numerical value of the forces being measured in response to said display signal.

* * * * *